United States Patent
Kirshon (10) Patent No.: US 12,089,057 B2
(45) Date of Patent: Sep. 10, 2024

(54) SYSTEM AND METHOD FOR IMPROVING NETWORK COVERAGE USING DEVICE LOCATION MANAGEMENT

(71) Applicant: Ottopia Technologies Ltd., Tel Aviv (IL)

(72) Inventor: Alexander Kirshon, Netanya (IL)

(73) Assignee: Ottopia Technologies Ltd., Tel Aviv (IL)

( * ) Notice: Subject to any disclaimer, the term of this patent is extended or adjusted under 35 U.S.C. 154(b) by 0 days.

(21) Appl. No.: 18/173,483

(22) Filed: Feb. 23, 2023

(65) Prior Publication Data

US 2023/0422049 A1 Dec. 28, 2023

Related U.S. Application Data (63) Continuation-in-part of application No. 17/809,178, filed on Jun. 27, 2022, now Pat. No. 11,870,699.

(51) Int. Cl.
*H04W 16/18* (2009.01)
(52) U.S. Cl.
CPC .................................. *H04W 16/18* (2013.01)
(58) Field of Classification Search
None
See application file for complete search history.

(56) References Cited

U.S. PATENT DOCUMENTS

| | | | |
|---|---|---|---|
| 6,816,492 B1 | 11/2004 | Turner et al. | |
| 6,920,120 B2 | 7/2005 | Huang et al. | |
| 7,782,901 B2 | 8/2010 | Wang | |
| 9,178,822 B2 | 11/2015 | Norp et al. | |
| 9,542,749 B2 | 1/2017 | Freedman et al. | |
| 10,791,485 B2 | 9/2020 | Patil et al. | |

(Continued)

FOREIGN PATENT DOCUMENTS

| | | |
|---|---|---|
| CN | 101404622 A | 4/2009 |
| CN | 111431822 A | 7/2020 |

(Continued)

OTHER PUBLICATIONS

Ashutosh Srivastava. "MPCC : Online learning multipath congestion control". Apr. 5, 2022 on reproducing research, transport layer, multipath. https://witestlab.poly.edu/blog/mpcc-online-learning-multipath-congestion-control/.

(Continued)

*Primary Examiner* — Angela Nguyen
(74) *Attorney, Agent, or Firm* — M&B IP Analysts, LLC (57) ABSTRACT

Techniques for improving network connectivity. A method includes creating at least one network connectivity map based on a first set of network connectivity data for historical devices operating within a network; obtaining data for a plurality of devices currently operating within the network, wherein the obtained data includes a second set of network connectivity data for the plurality of devices and a plurality of task statuses for tasks assigned to the plurality of devices; and manipulating a first device of the plurality of devices in order to improve network connectivity of a second device of the plurality of devices, wherein the first device is manipulated based on the second set of network connectivity data, the plurality of task statuses, and the at least one network connectivity map.

20 Claims, 8 Drawing Sheets

(56) References Cited

U.S. PATENT DOCUMENTS

| | | | |
|---|---|---|---|
| 11,018,791 B2 | 5/2021 | Götz et al. | |
| 11,051,134 B2 | 6/2021 | Loon et al. | |
| 11,304,092 B2 | 4/2022 | Park et al. | |
| 2007/0015525 A1 | 1/2007 | Beming et al. | |
| 2007/0025242 A1 | 2/2007 | Tsang | |
| 2011/0072286 A1* | 3/2011 | Graham | H04W 52/0258 |
| | | | 713/323 |
| 2016/0212774 A1* | 7/2016 | Tran Le | H04W 52/0206 |
| 2016/0218818 A1 | 7/2016 | Lorenz et al. | |
| 2017/0134981 A1* | 5/2017 | Duschl | H04W 72/51 |
| 2019/0246221 A1 | 8/2019 | Shariati | |
| 2020/0153919 A1 | 5/2020 | Xiong et al. | |
| 2020/0288316 A1 | 9/2020 | Kanagarathinam et al. | |
| 2021/0168905 A1 | 6/2021 | Yu | |

FOREIGN PATENT DOCUMENTS

| | | |
|---|---|---|
| DE | 102020206872 A1 | 12/2021 |
| WO | 2021163684 A1 | 8/2021 |

OTHER PUBLICATIONS

Science Direct. Transport Layer Protocol. https://www.sciencedirect.com/topics/computer-science/transport-layer-protocol.

T. Viernickel, A. Froemmgen, A. Rizk, B. Koldehofe and R. Steinmetz, "Multipath Quic: A Deployable Multipath Transport Protocol," 2018 IEEE International Conference on Communications (ICC), 2018, pp. 1-7, doi: 10.1109/ICC.2018.8422951. https://ieeexplore.ieee.org/document/8422951.

* cited by examiner

FIG. 7

SYSTEM AND METHOD FOR IMPROVING NETWORK COVERAGE USING DEVICE LOCATION MANAGEMENT

CROSS-REFERENCE TO RELATED APPLICATIONS

This application is a continuation-in-part of U.S. patent application Ser. No. 17/809,178 filed on Jun. 27, 2022, now pending, the contents of which are hereby incorporated by reference.

TECHNICAL FIELD

The present disclosure relates generally to network coverage for moving systems, and more specifically to improving network coverage using devices based on device locations.

BACKGROUND

Recent years have seen the increasing adoption of communicating among moving devices such as vehicles. As a particular example, drones have been adopted and used for many more purposes. These communicating vehicles may rely on communications from other vehicles and/or from central systems such as base stations in order to receive, for example, navigation instructions, information about potential hazards (e.g., weather, terrain, obstacles, etc.), information related to coordinating multiple vehicles, and so on.

Particularly when relying on communications to make appropriate navigation decisions, it is crucial that vehicles be able to send and receive communications. To this end, it can be critical to maintain reception for those vehicles. However, devices can lose reception while moving for various reasons, one of which is gaps in network coverage which may occur in certain locations within networks. For example, in cellular networks, there may be "dead zones" where a vehicle cannot get a suitable signal from the base station in any of the cells. Such loss of reception could jeopardize the device, any cargo it may be carrying, bystanders who could be struck by a vehicle, and much more.

Solutions which improve network coverage for vehicles are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improving network connectivity. The method comprises: creating at least one network connectivity map based on a first set of network connectivity data for historical devices operating within a network; obtaining data for a plurality of devices currently operating within the network, wherein the obtained data includes a second set of network connectivity data for the plurality of devices and a plurality of task statuses for tasks assigned to the plurality of devices; and manipulating a first device of the plurality of devices in order to improve network connectivity of a second device of the plurality of devices, wherein the first device is manipulated based on the second set of network connectivity data, the plurality of task statuses, and the at least one network connectivity map.

Certain embodiments disclosed herein also include a non-transitory computer readable medium having stored thereon causing a processing circuitry to execute a process, the process comprising: creating at least one network connectivity map based on a first set of network connectivity data for historical devices operating within a network; obtaining data for a plurality of devices currently operating within the network, wherein the obtained data includes a second set of network connectivity data for the plurality of devices and a plurality of task statuses for tasks assigned to the plurality of devices; and manipulating a first device of the plurality of devices in order to improve network connectivity of a second device of the plurality of devices, wherein the first device is manipulated based on the second set of network connectivity data, the plurality of task statuses, and the at least one network connectivity map.

Certain embodiments disclosed herein also include a system for improving network connectivity. The system comprises: a processing circuitry; and a memory, the memory containing instructions that, when executed by the processing circuitry, configure the system to: create at least one network connectivity map based on a first set of network connectivity data for historical devices operating within a network; obtain data for a plurality of devices currently operating within the network, wherein the obtained data includes a second set of network connectivity data for the plurality of devices and a plurality of task statuses for tasks assigned to the plurality of devices; and manipulate a first device of the plurality of devices in order to improve network connectivity of a second device of the plurality of devices, wherein the first device is manipulated based on the second set of network connectivity data, the plurality of task statuses, and the at least one network connectivity map.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include techniques for improving network coverage. In particular, various disclosed embodiments provide techniques for improving network coverage across devices operating within the same network such as by utilizing devices as relay points for other devices. The disclosed embodiments provide improvements to network communications of devices in order to improve signal strength and avoid dropping or otherwise losing data being transmitted to recipient devices which could cause mission-critical failures. Various disclosed embodiments utilize mapping of historical network connectivity data in order to identify dead zones or other areas where network connectivity may be unsuitable, which in turn can be utilized to determine when to manipulate devices in order to improve network coverage and where to reposition the manipulated devices in order to ensure that network coverage is successfully improved.

Various disclosed embodiments include techniques for utilizing devices as relay points for other devices based on mapped connectivity data and task statuses for devices operating in the network. To this end, idle devices may be repositioned and configured to act as relay points, or active devices may be navigated in order to allow them to act as relay points for other devices at least temporarily. Moreover, devices having different capabilities may be leveraged in order to facilitate communications between otherwise incompatible systems. For example, a device configured to communicate via a first frequency band used by a source of a transmission and to communicate via a second frequency band used by a destination for the transmission may be utilized as a relay device in order to allow the source to successfully transmit data to the destination even when the destination is not configured to receive communications over the frequency band used by the source.

Figure 1A:
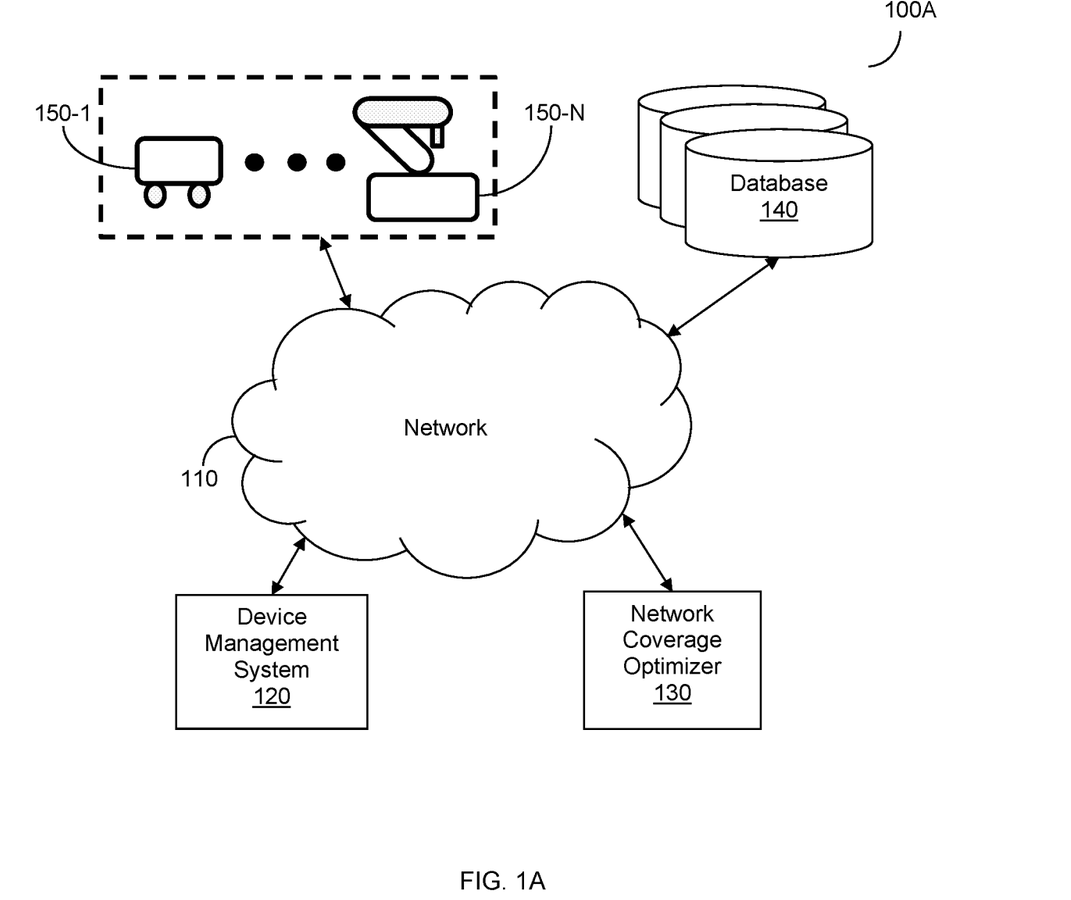
FIGS. 1A-B are network diagrams utilized to describe various disclosed embodiments.
Figure 1B:
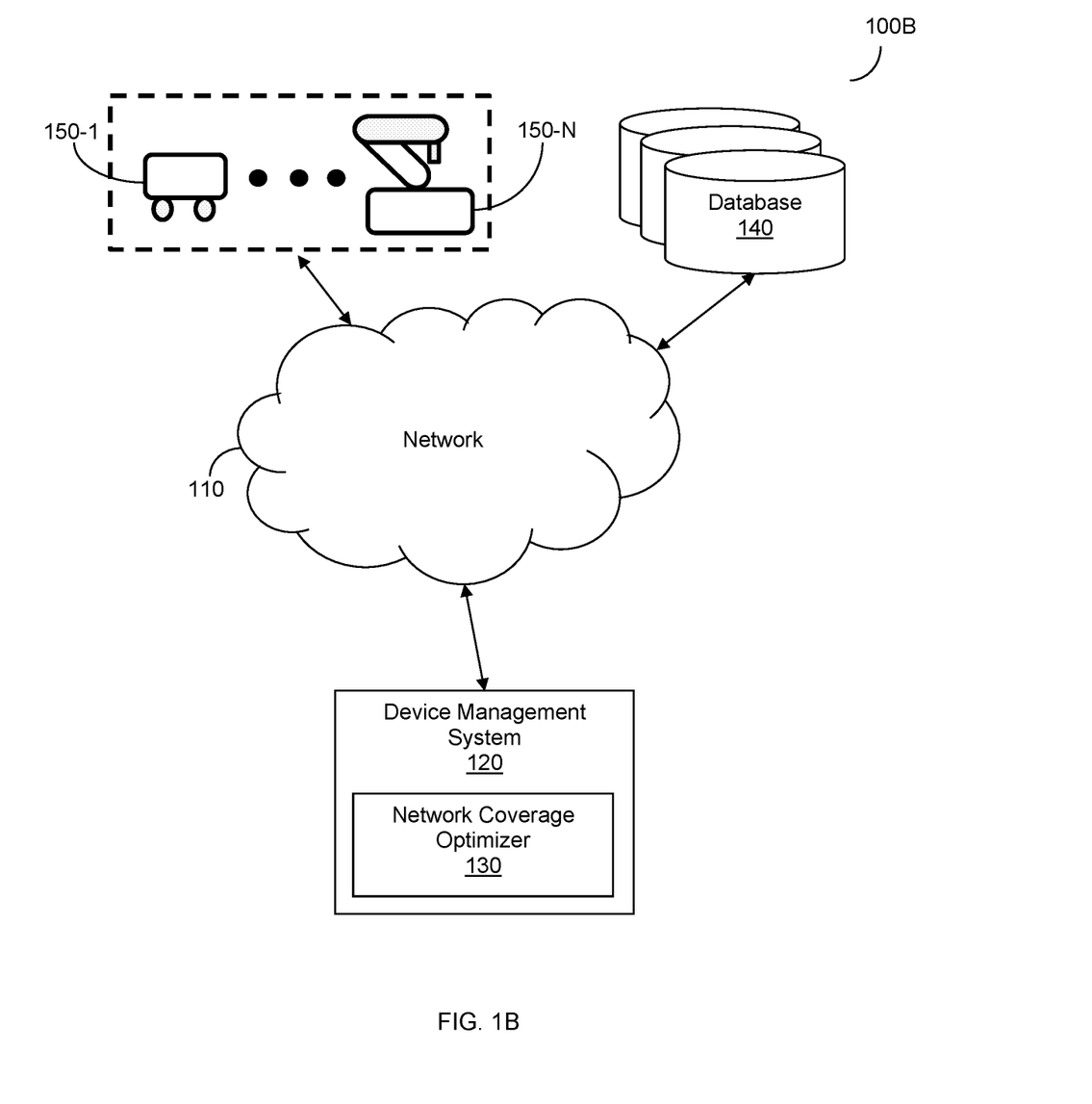

FIGS. 1A-B show example network diagrams 100A and 100B, respectively, utilized to describe the various disclosed embodiments.

In the example network diagrams 100A and 100B, a device management system 120, a network coverage optimizer 130, a plurality of databases 140-1 through 140-N, and a plurality of devices 150-1 through 150-N (hereinafter referred to individually as a vehicle 150 and collectively as devices 150, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The device management system 120 is configured to manage communications among the devices 150 and may be, but is not limited to, a fleet management system (FMS) or other vehicle management system (VMS). Such a fleet management system may be configured to track where vehicles are (location), where vehicles are going, and what tasks must be performed by the vehicles.

More specifically, in accordance with various disclosed embodiments, the device management system 120 is configured to generate, collect, or otherwise obtain data related to network connectivity of the devices 150 as well as task statuses for tasks assigned to the devices 150. In accordance with various disclosed embodiments, such data is utilized in order to coordinate among the devices 150 in order to improve network connectivity of at least some of the devices 150.

The network coverage optimizer 130 is configured to improve network connectivity for at least some of the devices 150 in accordance with various disclosed embodiments. More specifically, the network coverage optimizer 130 is configured to make decisions for improving network connectivity based on data including current network connectivity of the devices 150 and task statuses for tasks being performed (either previously, currently, or to be performed in the future) by the devices 150.

In FIG. 1A, the network coverage optimizer 130 is depicted as a separate system from the device management system 120. As a non-limiting example, each of the network coverage optimizer 130 and the device management system 120 may be realized as a server communicating with the other server. However, it should be noted that the disclosed embodiments are not limited as such. To this end, FIG. 1B illustrates another embodiment in which the network coverage optimizer 130 is realized as a component of the device management system 120. Specifically, the network coverage optimizer 130 may be realized as a hardware component of the device management system 120, or as a logical component (e.g., as a computer program or otherwise as instructions for performing at least a portion of the disclosed methods).

The databases 140 may store data such as, but not limited to, the data obtained by the device management system 120. The databases 140 may be accessed by the network coverage optimizer 130 in order to perform at least a portion of the disclosed embodiments.

Figure 2:
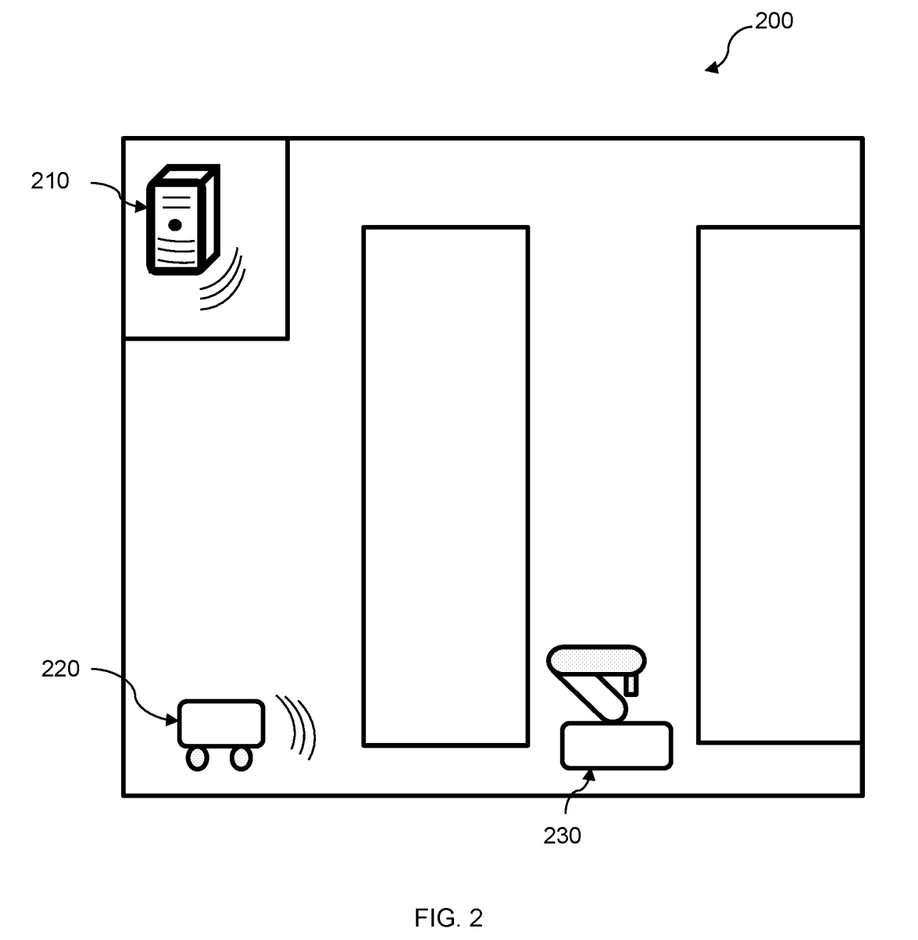
FIG. 2 is a warehouse diagram utilized to describe various disclosed embodiments.

The devices 150 include, but are not limited to, vehicles such as drones, robots, or other devices which may move or perform activities within an environment (e.g., the environment depicted in the warehouse diagram 200, FIG. 2). Each of the devices 150 is configured to perform one or more tasks, and may require network connectivity pursuant to those tasks (e.g., to receive instructions to perform tasks or otherwise to retrieve information to be utilized for performing tasks).

It should be noted that particular kinds of devices 150 are depicted in FIGS. 1A-B merely for example purposes, and that at least some of the disclosed embodiments are not limited to any particular kind of vehicle or device. Moreover, various disclosed embodiments may be equally applicable to other kinds of devices which may move (either through their own locomotion or being transported by another moving entity) and/or to devices which perform tasks but do not necessarily move (e.g., a robot with a stationary base that has an arm which moves in order to perform tasks) without departing from the scope of the disclosure. In other words, various disclosed embodiments may be utilized to improve network connectivity for devices whose position may change regardless of whether those devices would be categorized as vehicles or whether those devices move themselves or are moved by something else. Even further, some of the devices 150 may be stationary in accordance with various disclosed embodiments.

It should also be noted that the databases 140 are depicted as separate from the device management system 120, but that the databases 140 may be incorporated in the device management system 120 in accordance with at least some embodiments.

FIG. 2 is an example warehouse diagram 200 utilized to describe various disclosed embodiments. The warehouse diagram 200 depicts an environment in which one or more devices are deployed such as, but not limited to, the server 210 and the robotic devices 220 and 230.

In the example shown in FIG. 2, the server 210 operates as a device management system for the robotic devices 220 and 230. To this end, the server 210 is configured to communicate with the robotic devices 220 and 230 in order to transmit data related to tasks to be performed by either or both of the robotic devices 220 and 230.

In the example shown in FIG. 2, the server 210 is further configured to perform at least a portion of the disclosed embodiments for network coverage improvement. As a non-limiting example, the robotic device 230 may be equipped with a robotic arm and configured to perform tasks using the robotic arm based on instructions received from the server 210. When there is poor network coverage in the portion of the warehouse in which the robotic device 230 is positioned, the robotic device 230 may be unable to or may be inconsistent in receiving transmissions from the server 210 and, consequently, may not operate in accordance with the instructions being sent from the server 210.

Further pursuant to this example, the server 210 may be configured to utilize the robotic device 220 in order to improve network coverage in the area within the warehouse where the robotic device 230 is deployed. To this end, the server 210 may be configured to send instructions for moving the robotic device 220, for opening an access point (e.g., a WiFi hotspot), both, and the like. Such an access point may be opened at a position where the network coverage may be improved in order to allow transmissions from the server 210 to consistently reach the robotic device 230. For example, the robotic device 220 may be moved to a position where it is both closer to the robotic device 230 and where the line of transmission between the robotic devices 220 and 230 is only partially obscured, as depicted in FIG. 2.

In this regard, it is noted that warehouses may deploy robots, for example, in order to perform repetitive tasks. Instructions related to performing such tasks may need to be communicated within a network used by devices deployed in the warehouse. However, many warehouses include a large amount of metal, which may interfere with certain types of network connections (e.g., those of cellular networks). Accordingly, the disclosed embodiments may be utilized to improve network connectivity by minimizing interference within those environments.

It should be noted that a single server and two robotic devices are depicted in FIG. 2 merely for simplicity purposes, but the disclosed embodiments are not limited to such a deployment. Multiple servers and more than two devices may be equally utilized without departing from the scope of the disclosure. Further, the server 210 is discussed as being configured to perform functions related to both device management and network coverage optimization, but that a separate system may be configured to perform one of these functions (e.g., as depicted with respect to the device management system 120 and the network coverage optimizer 130 of FIG. 1A) without departing from the scope of the disclosure.

Figure 3:
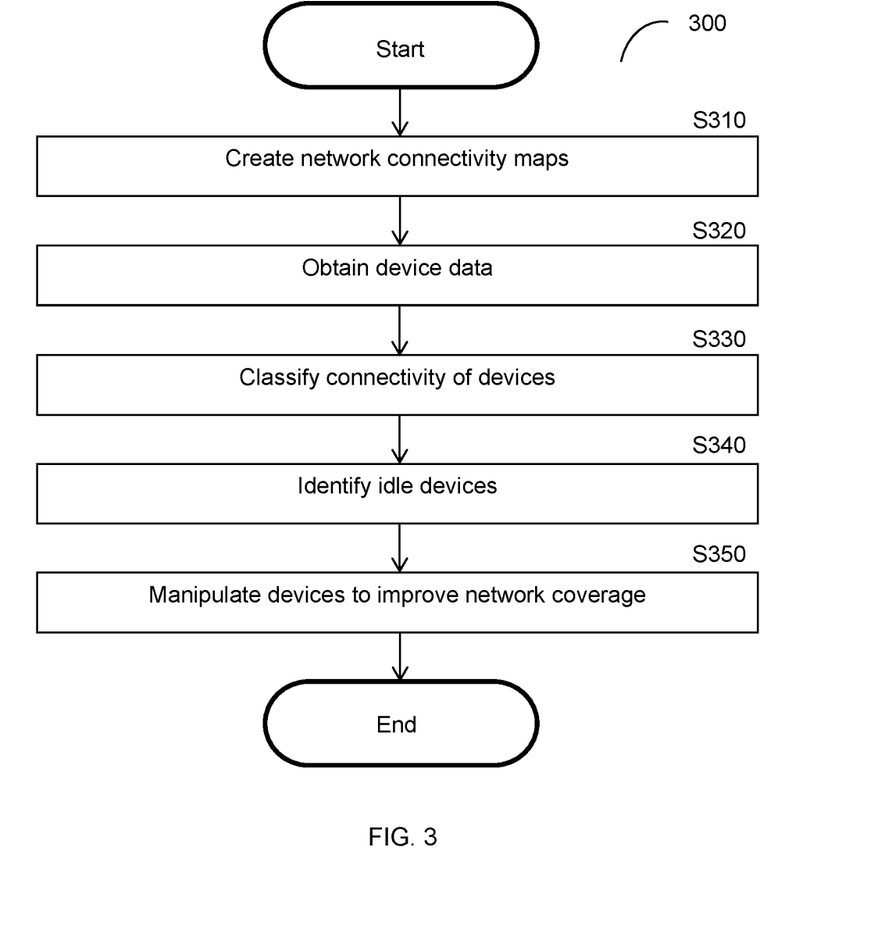
FIG. 3 is a flowchart illustrating a method for improving network connectivity according to an embodiment.

FIG. 3 is a flowchart 300 illustrating a method for improving network coverage according to an embodiment. In an embodiment, the method is performed by the network coverage optimizer 130, FIGS. 1A-B.

At S310, one or more network connectivity maps are created based on historical network connectivity data of devices operating within a network. Creating the network connectivity maps includes populating at least a portion of a data structure with the relevant connectivity data and may include, but is not limited to, creating a new map or updating an existing map. In an embodiment, the heatmaps are created on a per-device basis for devices which may be, for example, communicating via different networks, via different types of connections, combinations thereof, and the like. In an embodiment, each network connectivity map is created as described further below with respect to FIG. 4.

At S320, data related to devices currently operating within the network is obtained. At least some of the devices are moving within the network or otherwise capable of moving. In an embodiment, the data includes, but is not limited to, device positions and task statuses for tasks to be performed by the devices. The task statuses may indicate tasks to be performed by each device as well as whether each task has been completed, is in progress, or has not yet started. The task statuses may further indicate a schedule for each task (e.g., a time or time period at which the task is scheduled to be performed), a queue of tasks (i.e., an order in which the device is to perform the tasks), both, and the like. To this end, each task may be assigned to a respective device or group of devices.

At optional S330, a connectivity for each of the devices is classified. In an embodiment, a connection being used by each device may be classified as either infrastructure or mesh. An infrastructure connection is a connection to a component of the network infrastructure such as, but not limited to, a server, router, or other component of the network. A mesh connection is a connection to another device communicating via the network, i.e., such that a mesh connection is inter-device for devices operating within the network. For example, a connection via a relay point device may be classified as a mesh connection.

At S340, potential relay devices among the devices operating within the network are identified. The potential relay devices may be selected based on factors such as, but not limited to, locations of the devices relative to the network connectivity maps, capabilities of the devices, task statuses of the devices, combinations thereof, and the like.

In some embodiments, the potential relay devices include idle devices. Such idle devices include devices which are not currently performing any tasks and which are not scheduled to perform additional tasks in the near future (e.g., within a threshold period of time, where the threshold may depend upon the amount of time for which transmissions need to be sent while improving network coverage). To this end, S340 may include analyzing the data obtained at S320 and, in particular, the task statuses, in order to determine whether each device has any task statuses which indicate tasks are currently being performed or are queued to be performed in the future.

Alternatively or additionally, active devices (i.e., devices which are currently performing tasks, scheduled to perform tasks in the near future, or otherwise are not idle) may be identified as potential relay devices. To this end, the potential relay devices may further be selected based on additional active device selection criteria. Such active device selection criteria may be based on, but is not limited to, planned navigation paths for the active devices, upcoming tasks assigned to the active devices (for example, tasks requiring the active devices to be at certain locations), both, and the like.

At S350, devices among the devices currently operating within the network are manipulated in order to improve network coverage. In an embodiment, S350 includes sending instructions that, when executed, cause certain devices within the network to operate in a manner that improves network connectivity of other devices in the network. To this end, such instructions may include, but are not limited to, instructions for causing those devices to change positions, to cause the devices to become reconfigured, to cause the devices to open channels or otherwise establish network connections, combinations thereof, and the like. In a further embodiment, S350 includes manipulating devices selected to be relay points between a source system and a destination device in order to improve network connectivity between the source and the destination.

In an embodiment, the manipulation of the devices is performed based on the network connectivity maps created at S310. More specifically, the devices are manipulated based on dead zones or other areas where signal strength may be unsuitable (e.g., where one or more network connection indicators are below respective thresholds or where an aggregated score for multiple network connection indicators are below an aggregate threshold) in order to improve the signal strength by manipulating one or more devices in order to improve signal strength of other devices operating in the network.

In an embodiment, one or more idle devices may be leveraged, for example by selecting certain idle devices as relay points and causing those idle devices to move to positions between the source and destination in order to serve as relay points.

Alternatively or in combination, active devices (i.e., devices which are currently performing tasks, scheduled to perform tasks in the near future, or otherwise are not idle) may be leveraged. Manipulating active devices may include, but is not limited to, controlling navigation of active devices in order to allow them to act as relay points for other devices, controlling navigation of active devices in order to navigate around areas with unsuitable network coverage (e.g., based on one or more network connectivity indicators or a combination of network connectivity indicators below respective thresholds), causing those active devices to navigate to certain locations during spare time between tasks, combinations thereof, and the like. To this end, when active devices are being manipulated, S350 may include determining an optimal navigation route for each active device being manipulated in order to allow the active device to act as a relay point for another device during at least for a portion of its navigation.

In an embodiment, S350 further includes manipulating the devices in a manner that enhances networking capabilities of devices via collective action. More specifically, a device having certain networking capabilities may be manipulated and utilized as a relay point for devices which do not have those networking capabilities, thereby effectively allowing the devices without those networking capabilities to ultimately receive transmissions which originally could only be received by devices having those networking capabilities. An example process for enhancing network capabilities using devices as relay points is described further below with respect to FIG. 5.

As a non-limiting example, a drone operating in a warehouse may only have WiFi capabilities related to the 2.4 GHz generation of WiFi, with fewer potential networking bands accessible to that drone. A drone having higher capabilities (e.g., from the 6 GHz generation of WiFi) may be utilized as a relay point for transmissions sent in one of the bands which is accessible to 6 GHz generation WiFi devices but not in the 2.4 GHz generation, and may pass on transmissions over a band that is accessible to 2.4 GHz generation devices, thereby allowing a 2.4 GHz device to receive transmissions which were originally sent over a band that is inaccessible to 2.4 GHz devices.

Figure 4:
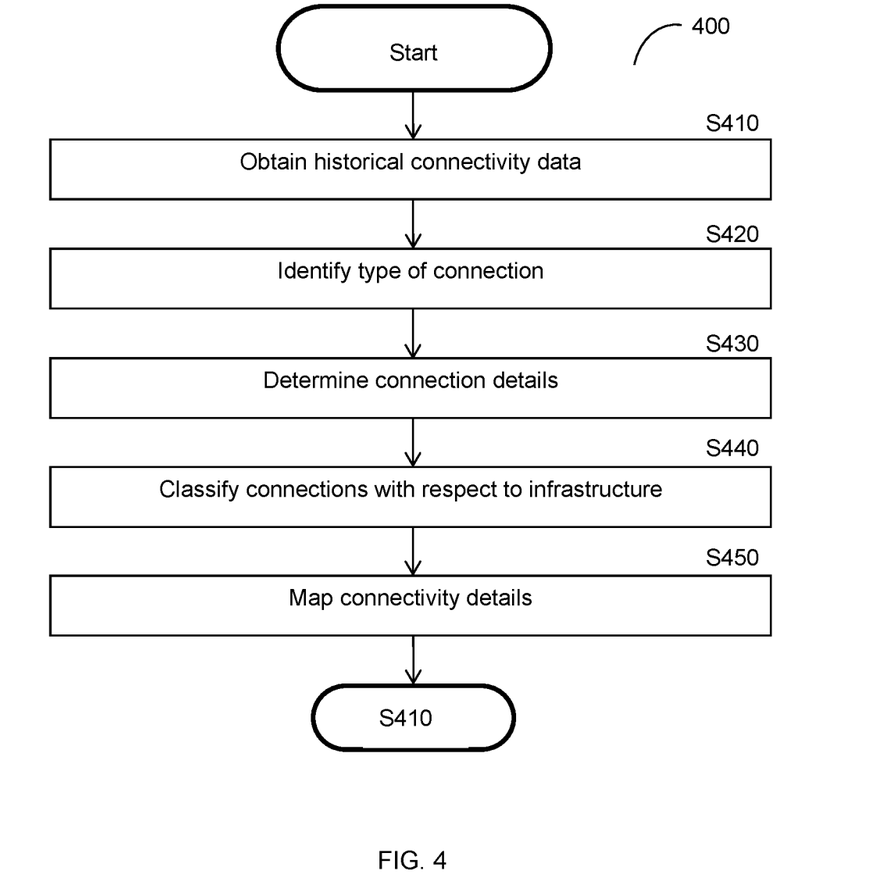
FIG. 4 is a flowchart illustrating a method for creating a network connectivity map according to an embodiment.

FIG. 4 is a flowchart 400 illustrating a method for creating a network connectivity map according to an embodiment. In an embodiment, the method is performed by the network coverage optimizer 130, FIGS. 1A-B.

At S410, historical connectivity data for a device is obtained. The historical connectivity data includes one or more network performance indicators such as, but not limited to, bandwidth, throughput, latency, jitter, and the like. The historical connectivity data further indicates information related to the communications of the device over time such as, but not limited to, a type of network through which the device communicates or otherwise a type of connection (e.g., cellular, WiFi, Bluetooth, etc.) used at each position occupied by the device, a specific network via which the device communicates at each position, frequencies at which the device communicates (e.g., frequency bands used by the device) at each position, combinations thereof, and the like.

At S420, a type of connection used by the device is identified. As noted above, the type of connection may be defined with respect to a type of network to which the device is connected at each time. The mapping may be defined such that different maps are created for devices using different types of connections. As a non-limiting example, while a first map may be created based on historical communications of a device communicating via a first network, and a second map may be created based on historical communications of a device communicating via a second network. Mapping connectivity with respect to specific types of connections allows for determining optimal relay point devices or otherwise for optimizing network performance for devices. More specifically, for a given type of connection to be used for a future transmission, the mapping of historical connectivity data for that type of connection may be utilized to identify dead zones or other areas where connections are unsuitable according to criteria defined in one or more connection suitability rules.

At S430, connection details are determined for connections made with the device indicated in the historical connectivity data. The connection details may include, but are not limited to, frequencies at which the device is communicating. Mapping connectivity with respect to such connection details allows for determining optimal relay point devices or otherwise for optimizing network performance for devices. More specifically, such data may be utilized to identify the strength of connections for devices communicating via particular frequency bands at different locations.

At optional S440, the connections indicated in the historical connectivity data are classified with respect to infrastructure. More specifically, each connection may be classified as either infrastructure or mesh. An infrastructure connection is a connection to a component of the network infrastructure such as, but not limited to, a server, router, or other component of the network. A mesh connection is a connection to another device communicating via the network, i.e., such that a mesh connection is inter-device for devices operating within the network. For example, a connection via a relay point device may be classified as a mesh connection.

Classifying connections as either infrastructure or mesh and mapping such classifications further improves the granularity of the mapping, and different maps may be created for devices having different connection classifications in order to more accurately represent different potential circumstances for network communications among devices, which in turn allows for making more accurate decisions about when and how to improve network connectivity. In particular, when using devices as relay points, utilizing mappings for devices having mesh connection classifications may provide more accurate information about dead zones or otherwise areas where network connectivity is unsuitable as compared to mappings for devices having infrastructure connection classifications since the connectivity between mesh devices may not be the same as the connectivity between a device and a server or other such system.

At S450, the connectivity information for the device is mapped. In an example implementation, the mapping is realized as one or more heatmaps having different values mapped to different locations. For example, each heatmap may have one or more network connectivity indicator values mapped to respective locations for which those values were recorded. In addition to being on a per-device basis, each map may be realized on a per-connection type basis, a per-frequency band basis, or a combination thereof. That is, each map may represent network connection indicator values at different positions for a device communicating through a particular type of network, over a particular band, or a combination of a network and frequency band. Mapping connectivity data with increased granularity such as by combination of network and frequency band allows for more accurately determining optimal configurations for improving network connectivity in accordance with various disclosed embodiments.

In accordance with various embodiments, the mapping may be performed continuously, iteratively, or otherwise updated over time. To this end, after S450, execution may continue with S410. In this regard, the network connectivity map may evolve over time as the network connectivity within the mapped area changes. For example, as new buildings are developed, the network connectivity to a particular point may change, and the network connectivity map may be updated to reflect this. Moreover, the network connectivity map may be created using data gathered from multiple devices which may or may not be owned by a centralized authority. In this way, the network connectivity mapping may be based on crowdsourced data in order to facilitate such continuous collection or otherwise to reduce the amount of work needed to obtain the data needed for the mapping.

Figure 5:
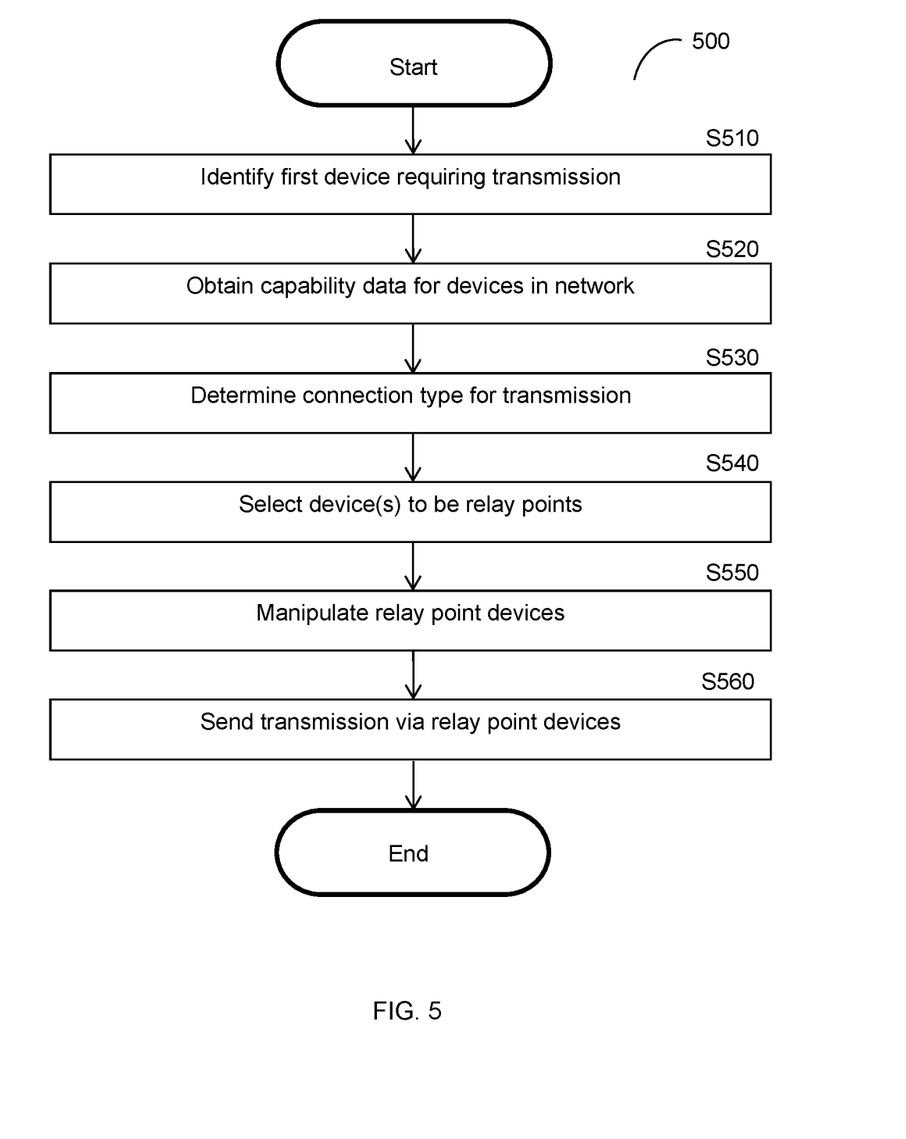
FIG. 5 is a flowchart illustrating a method for collectively enhancing networking capabilities by manipulating devices according to an embodiment.

FIG. 5 is a flowchart 500 illustrating a method for collectively enhancing networking capabilities by manipulating devices according to an embodiment. In an embodiment, the method is performed by the network coverage optimizer 130, FIGS. 1A-B.

At S510, one or more first recipient devices requiring transmissions is identified, i.e., a device to which data will be transmitted. In an embodiment, S510 further includes identifying a network in which the recipient devices are deployed. As a non-limiting example for the warehouse shown in FIG. 2, the robotic device 230 may be identified as a recipient device.

At S520, network connectivity data is obtained for devices operating within the network in which the recipient devices operate. The network connectivity data may be received, for example from each of the devices operating within the network. Such network connectivity data may include, but is not limited to, connectivity data, capability data, both, and the like. The connectivity data indicates information related to connections of the devices, for example, between each device and a source which will be transmitted data to the recipient devices.

The capability data indicates protocols, capacity, frequencies, types of networks, interfaces, configurations, or other information related to the capabilities of each device with respect to potential network communications. Such capability data may be realized in forms such as, but not limited to, drone manifests. As a non-limiting example, the capability data may indicate information such as whether the device has a WiFi interface, a capacity of the device, which protocols are used by the device, which versions of each protocol is the device configured to utilize, a network configuration of the device, or a combination thereof.

As another non-limiting example for drone capabilities, the capability data may indicate whether each device is a 2.4 GHz generation WiFi device (i.e., a device configured to utilize the channel available to devices operating via WiFi in the 2.4 GHz frequency), a 5 GHz generation WiFi device (i.e., a device configured to utilize the channels available to devices operating via WiFi in the 5 GHz frequency), or a 6 GHz generation WiFi device (i.e., a device configured to utilize the channels available to devices operating via WiFi in the 6 GHz frequency). A 5 GHz generation WiFi device may be capable of accessing more channels than a 2.4 GHz generation WiFi device, and likewise a 6 GHz generation WiFi device may have access to channels which both 2.4 GHz and 5 GHz generation devices are not capable of accessing. As will be discussed further below, the capabilities both of the recipient devices and of potential relay point devices may be utilized to determine optimal configurations for transmitting data via relay point devices.

At S530, a connection type is determined for a connection to be utilized to transmit data to the recipient devices. As a non-limiting example, a type of connection being utilized by a server (e.g., the server 210, FIG. 2) acting as a source of a transmission may be determined. Such a connection type is relevant for selecting an appropriate relay point device, for example, such that a relay point device capable of receiving communications via that connection type can be selected.

At S540, one or more second relay point devices are selected to be used as relay points. In an embodiment, the relay point devices are selected based on capabilities of the devices operating within the same network as the recipient device. In a further embodiment, the relay point devices may be selected based on their capabilities in relation to the requirements of the transmission (e.g., a channel or frequency by which the data will be transmitted from an origin such as the server 210, FIG. 2) as well capabilities of the destination (e.g., a device such as the robotic device 230, FIG. 2).

In yet a further embodiment, a relay point may be selected such that the relay point has capabilities which allow the relay point to send transmissions to multiple recipient devices operating on different channels or frequencies. To this end, in some implementations, the selected relay point may be a relay point having higher frequency WiFi capabilities so that the relay point is capable of sending transmissions both to devices communicating over higher frequency bands as well as to devices communicating over lower frequency bands. As a non-limiting example, when the recipient devices include devices having 2.4 GHz WiFi capabilities, 5 GHz WiFi capabilities, and 6 GHz WiFi capabilities (i.e., such that some 5 GHz WiFi devices may communicate over bands which are inaccessible to the 2.4 GHz WiFi devices, and some of the 6 GHz WiFi devices may communicate over bands which are inaccessible to the 2.4 GHz WiFi devices and/or the 5 GHz WiFi devices), a 6 GHz WiFi device may be selected so that the relay point device can communicate over bands being used by any of the recipient devices.

At S550, the relay point devices are manipulated in preparation for sending the transmission. Such manipulation may include, but is not limited to, repositioning the relay point devices, reconfiguring the relay point devices (e.g., to send transmissions over a different band than the relay point device uses for receiving transmissions), both, and the like. To this end, S550 may include, but is not limited to, sending instructions for repositioning and/or reconfiguring the relay point devices. Moreover, different instructions may be sent to each relay point device.

In some embodiments, S550 may include reconfiguring the relay point devices to receive data across multiple channels in order to enable sending the data via a multi-channel network congestion control algorithm. Specifically, one or more of the relay point devices are reconfigured in order to receive communications via each of the multiple channels and to connect a synchronizing component of the relay point device to each channel used by a source transmitting data using the multi-channel congestion control algorithm. An example process for multi-channel congestion control which may be utilized by such a source in accordance with this embodiment is described further below with respect to FIG. 6.

At S560, one or more transmissions are sent to the first device via the second devices acting as relay points. To this end, S560 includes sending each transmission to a relay point device so that the relay point device can send the transmission either to another relay point device or to the first device.

In this regard, it has been identified that, as devices communicating over networks have been adopted for many years, the standards and capabilities of those devices have evolved over time. As a result, communications over certain channels or frequencies may be possible to receive for some devices and not others. Thus, selecting relay point devices whose communications are compatible with both the capabilities of the origin and the destination may allow for successfully transmitting data to devices without altering the transmission at the origin.

Further, it has been identified that higher frequencies of communication tend to be more subject to interference, and that use of relay point devices may allow for mitigating this interference. More specifically, when a transmission is to be broadcast at a higher frequency, a relay point device may be deployed closer to the origin than the intended recipient device. This mitigates interference at each transmission (i.e., a first transmission from an origin to a relay point device and a second transmission from a relay point device to a destination) as compared to the interference for a single transmission from the origin to the destination. Moreover, the relay point device may transmit data to the destination using a lower frequency band in order to further mitigate interference.

Figure 6:
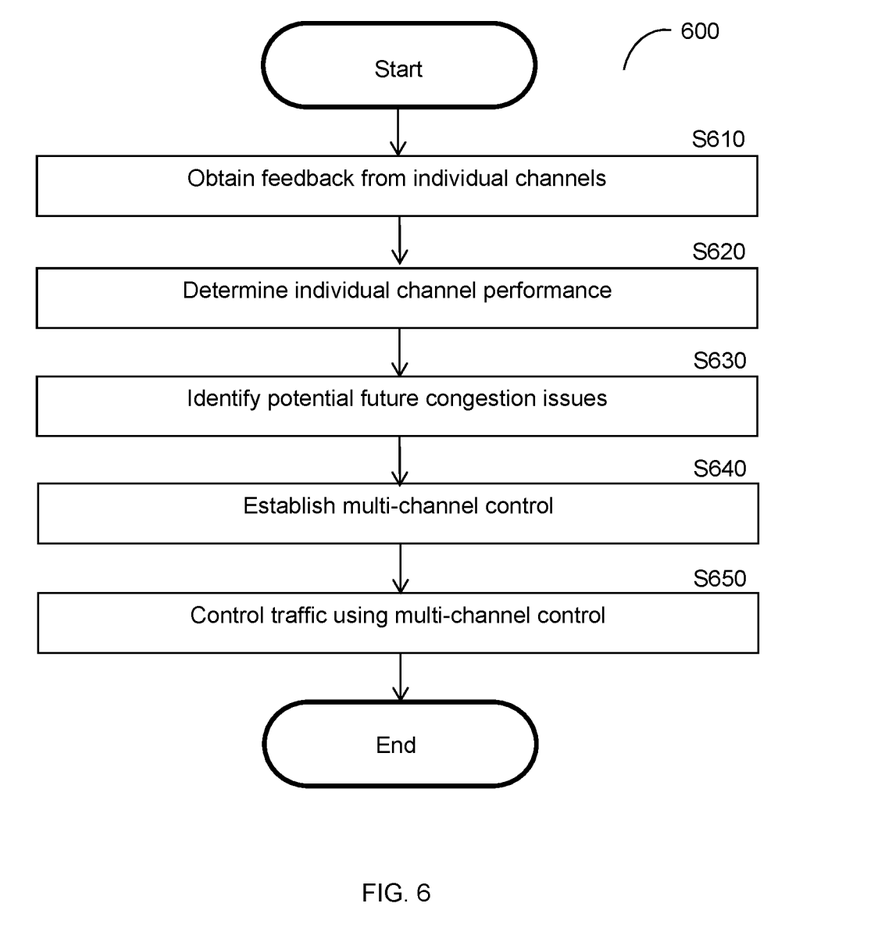
FIG. 6 is a flowchart illustrating a method for multi-channel network congestion control according to an embodiment.

FIG. 6 is a flowchart 600 illustrating a method for multi-channel network congestion control according to an embodiment. In an embodiment, the method is performed by the device management system 120, FIGS. 1A-B. As noted above, the multi-channel network congestion control may be utilized to further improve network connectivity by transmitting data to devices via multiple channels in a manner that improves reliability and latency of connections. Moreover, the process described with respect to FIG. 6 allows for adapting individual channel congestion control algorithms for multipath congestion control such that congestion control is performed cross-channel.

In accordance with various disclosed embodiments, multiple channels may be utilized. A non-limiting example of multiple channels which may be utilized in accordance with the relay device embodiments discussed above is a setup where a connection through one or more relay devices is a first channel and a non-relay connection that does not go through any relay devices is a second channel. In this regard, the method of FIG. 6 may be utilized in coordination with the techniques utilizing relay devices in order to further improve network performance by controlling traffic to both the relay channels and the non-relay channels in order to reduce or eliminate potential congestion issues.

At S610, feedback from multiple individual communication channels is obtained. In an example implementation, the feedback is received via network interfaces used for communicating via the respective channels. In various implementations, such feedback data is being sent to the device communicating via these channels. As a non-limiting example, when a data stream source is installed on a drone having multiple network interfaces such as a cellular network interface and a satellite network interface, the drone may receive respective feedback data through each interface.

At S620, the feedback from the individual communication channels is analyzed for performance. In an embodiment, the performance which is analyzed includes a responsiveness of each channel. The responsiveness may be defined with respect to an amount of time (e.g., an average amount of time) between identification of a congestion issue and occurrence of the congestion issue (e.g., as demonstrated by decrease in one or more performance metrics such as latency). The responsiveness may further be defined with respect to whether the congestion issues are identified before or after the congestion issues occur.

In an optional implementation, S620 may further include analyzing the feedback to determine a reliability of each protocol used by each channel. The reliability of different protocols may be used to select protocols to be used by channels when sending packets in accordance with certain disclosed embodiments.

At S630, potential future congestion issues are identified based on the feedback from the individual communication channels. In an embodiment, S630 includes performing statistical modeling with respect to responsiveness based on the feedback data and a data stream to be sent over channels in order to determine one or more anticipated drops in responsiveness which represent potential future congestion issues.

At S640, multi-channel control is established with respect to the multiple channels. In an embodiment, S640 includes connecting each of the channels to a scheduling component on a transmitting end (e.g., the device management system 120, FIGS. 1A-B) and to a synchronizing component on a receiving end (e.g., a synchronizing component of one of the devices 150, FIGS. 1A-B). Each of the scheduling component and the synchronizing component is a logical component or system and is configured to perform a respective portion of the disclosed embodiments. The scheduling component is connected to the channels such that it can access the channels to send packets, and the synchronizing component is connected to the channels such that it can access the channels to receive packets. To this end, connecting the scheduling component or the synchronizing component to a given channel may include establishing communication between the component and the channel.

By connecting the channels to the scheduling and synchronizing components configured to collectively perform the disclosed embodiments, control over the channels is established. Further, since the logic for congestion control is realized via the connected scheduling component, multi-channel congestion control may be established without requiring deploying the congestion control logic among the individual channels.

In some embodiment, S640 may optionally include modifying an interface of each channel (e.g., the network interface used to communicate via that channel). More specifically, a configuration of each interface may be modified in order to connect the scheduling and synchronizing components. Alternatively or additionally, additional logic may be used to reroute packets or otherwise cause the scheduling and synchronizing components to be able to intercept traffic going in to or coming out of any of the channels.

At S650, traffic is controlled using the multi-channel control established at S640. Controlling the traffic includes at least controlling which packets are sent via which channels and the schedule for sending those packets. Controlling the traffic may further include, but is not limited to, controlling the metadata sent in the packets, enriching the metadata sent in the packets, selecting protocols or algorithms to be used by the channels while transmitting certain packets, combinations thereof, and the like.

In this regard, it is noted that existing single channel congestion control solutions may address congestion issues by either buffering packets or returning signals indicating that packets cannot be sent currently. The disclosed embodiments provide an alternative way of addressing congestion using the existing single channel congestion control protocols by rerouting packets directed toward one channel into interfaces of one or more other channels, which may allow packets to be sent immediately without requiring buffering, thereby improving latency. The disclosed embodiments may further utilize a signal-generating component or otherwise may include generating return signals indicative of potential congestion control issues while attempting to mitigate such issues by rerouting packets.

In an embodiment, controlling the traffic further includes determining a packet routing scheme and modifying at least some of the packets. Additional information about controlling the traffic may be found in the above-referenced U.S. patent application Ser. No. 17/809,178, the contents of which are hereby incorporated by reference.

Determining the packet routing scheme may include, but is not limited to, selecting a channel by which each packet among packets of a data stream should be sent. The channels for respective packets may be determined based on potential future congestion issues (e.g., the potential future congestion issues identified at S630). More specifically, when a congestion issue is anticipated for one channel, packets intended to be sent via that channel may be rerouted in order to mitigate or avoid the anticipated congestion issue. The packet routing scheme may further be based on scheduling for the packets. The scheduling is performed in order to regulate how much data is sent through a given channel at one time, and may be determined based on the feedback and, in particular, based on error messages or other feedback data indicating failure to transmit packets when the total amount of data being sent is above a certain amount At least some of the packets are modified in order to support synchronization on the receiving end (i.e., for the systems or components receiving the packets over the different channels). More specifically, packets lacking timing data which may be needed for synchronization purposes are modified to include timing data such that an order of the packets can be determined using the timing data of each of the packets. As a non-limiting example, a timestamp may be added to each such packet. In this regard, it is noted that single channel congestion control algorithms may not require timing data and, therefore, packets normally sent via those channels may or may not include timing data. Thus, in some embodiments, packets are modified in order to provide this timing data. In an embodiment, the timing data may be added as metadata of the packets, for example, to a header of each modified packet.

Figure 7:
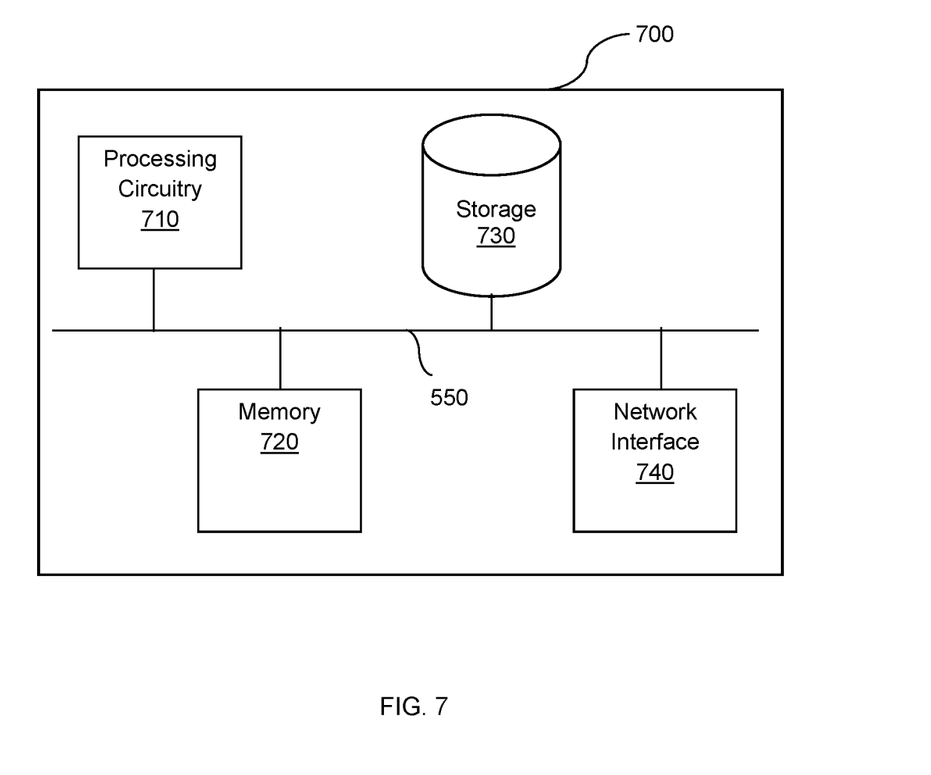
FIG. 7 is a schematic diagram of a hardware layer for a network coverage optimizer according to an embodiment.

FIG. 7 is an example schematic diagram of hardware layer 700 for a network coverage optimizer (e.g., the network coverage optimizer 130, FIGS. 1A-B) according to an embodiment. The hardware layer 700 may be, but is not limited to, a hardware layer of the network coverage optimizer, or a hardware layer of a system (e.g., the device management system 120) in which the network coverage optimizer is deployed as a logical component.

The hardware layer 500 includes a processing circuitry 710 coupled to a memory 720, a storage 730, and a network interface 740. In an embodiment, the components of the hardware layer 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the network coverage optimizer 130 to communicate with, for example, the device management system 120, the databases 140, the devices 150, and the like.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving network coverage, comprising:
    creating at least one network connectivity map based on a first set of network connectivity data for historical devices operating within a network;
    obtaining data for a plurality of devices currently operating within the network, wherein the obtained data includes a second set of network connectivity data for the plurality of devices and a plurality of task statuses for tasks assigned to the plurality of devices; and
    manipulating a first device of the plurality of devices in order to improve network connectivity of a second device of the plurality of devices, wherein the first device is manipulated based on the second set of network connectivity data, the plurality of task statuses, and the at least one network connectivity map.

2. The method of claim 1, wherein manipulating the first device further comprises:
    causing deployment of the first device as a relay point between a source of a transmission and the second device.

3. The method of claim 2, wherein the first device is deployed as a relay point such that the transmission is sent from the source to the first device and the transmission is sent from the first device to the second device.

4. The method of claim 1, further comprising:
    identifying, based on the plurality of task statuses, at least one idle device among the plurality of devices; and
    selecting, from among the at least one idle device, the first device to be used as a relay point between a source of a transmission and the second device.

5. The method of claim 1, further comprising:
    selecting the first device from among the plurality of devices based on at least one capability of each of the plurality of devices and at least one capability of a source of a transmission to be sent to the second device.

6. The method of claim 5, wherein the first device is selected such that the first device is configured to receive communications sent according to capabilities of the source and the first device is configured to send communications according to capabilities of the second device.

7. The method of claim 5, wherein the first device is manipulated in order to act as a relay point for a subset of the plurality of devices including the second device, wherein the first device is selected such that the first device is configured to send communications according to capabilities of each device among the subset of the plurality of devices.

8. The method of claim 7, wherein each device of the subset of is configured to communicate via at least one respective frequency band, wherein the first device is configured to communicate via a plurality of frequency bands, wherein the plurality of frequency bands of the first device includes the at least one frequency band of each device among the subset.

9. The method of claim 1, wherein each network connectivity map includes at least one network connectivity indicator value for each of a plurality of positions.

10. The method of claim 1, wherein each of the at least one network connectivity map corresponds to a device having a respective set of properties, wherein each respective set of properties includes at least one of: a type of connection, a network, a frequency, and a range of frequencies.

11. The method of claim 10, wherein the respective set of properties for each network connectivity map includes a connection classification, wherein each connection classification is any of infrastructure and mesh, wherein the first device is manipulated based further on one of the at least one network connectivity map corresponding to a device having a connection classification matching a connection classification of the first device.

12. A non-transitory computer readable medium having stored thereon instructions for causing a processing circuitry to execute a process, the process comprising:

creating at least one network connectivity map based on a first set of network connectivity data for historical devices operating within a network;

obtaining data for a plurality of devices currently operating within the network, wherein the obtained data includes a second set of network connectivity data for the plurality of devices and a plurality of task statuses for tasks assigned to the plurality of devices; and manipulating a first device of the plurality of devices in order to improve network connectivity of a second device of the plurality of devices, wherein the first device is manipulated based on the second set of network connectivity data, the plurality of task statuses, and the at least one network connectivity map.

13. A system for improving network coverage, comprising:

a processing circuitry; and a memory, the memory containing instructions that, when executed by the processing circuitry, configure the system to:

create at least one network connectivity map based on a first set of network connectivity data for historical devices operating within a network;

obtain data for a plurality of devices currently operating within the network, wherein the obtained data includes a second set of network connectivity data for the plurality of devices and a plurality of task statuses for tasks assigned to the plurality of devices; and manipulate a first device of the plurality of devices in order to improve network connectivity of a second device of the plurality of devices, wherein the first device is manipulated based on the second set of network connectivity data, the plurality of task statuses, and the at least one network connectivity map.

14. The system of claim 13, wherein the system is further configured to:

cause deployment of the first device as a relay point between a source of a transmission and the second device, wherein the first device is deployed as a relay point such that the transmission is sent from the source to the first device and the transmission is sent from the first device to the second device.

15. The system of claim 13, wherein the system is further configured to:

identify, based on the plurality of task statuses, at least one idle device among the plurality of devices; and select, from among the at least one idle device, the first device to be used as a relay point between a source of a transmission and the second device.

16. The system of claim 13, wherein the system is further configured to:

select the first device from among the plurality of devices based on at least one capability of each of the plurality of devices and at least one capability of a source of a transmission to be sent to the second device.

17. The system of claim 16, wherein the first device is manipulated in order to act as a relay point for a subset of the plurality of devices including the second device, wherein the first device is selected such that the first device is configured to send communications according to capabilities of each device among the subset of the plurality of devices.

18. The system of claim 17, wherein each device of the subset of is configured to communicate via at least one respective frequency band, wherein the first device is configured to communicate via a plurality of frequency bands, wherein the plurality of frequency bands of the first device includes the at least one frequency band of each device among the subset.

19. The system of claim 13, wherein each network connectivity map includes at least one network connectivity indicator value for each of a plurality of positions.

20. The system of claim 13, wherein each of the at least one network connectivity map corresponds to a device having a respective set of properties, wherein the respective set of properties for each network connectivity map includes a connection classification, wherein each connection classification is any of infrastructure and mesh, wherein the first device is manipulated based further on one of the at least one network connectivity map corresponding to a device having a connection classification matching a connection classification of the first device.

* * * * *